US009321392B1

(12) United States Patent  
LeBrun (10) Patent No.: US 9,321,392 B1  
(45) Date of Patent: Apr. 26, 2016

(54) STRAP PROTECTION SYSTEM

(71) Applicant: Mark D. LeBrun, Osakis, MN (US)

(72) Inventor: Mark D. LeBrun, Osakis, MN (US)

( * ) Notice: Subject to any disclaimer, the term of this patent is extended or adjusted under 35 U.S.C. 154(b) by 0 days.

(21) Appl. No.: 14/601,562

(22) Filed: Jan. 21, 2015

(51) Int. Cl.
*B65D 3/00* (2006.01)
*B60P 7/08* (2006.01)

(52) U.S. Cl.
CPC ..................... *B60P 7/0869* (2013.01)

(58) Field of Classification Search
CPC .... B60R 22/00; B60R 22/14; B65D 2313/02; B65D 63/10; B65G 15/32; B65G 2201/06; B61D 45/001; B61D 45/00; B61D 45/003; B61D 17/08; B60N 2/42781; B60N 2/4885; B62J 11/00; B65B 11/025; B65H 54/585; B66D 1/7489
USPC ...... 410/99, 41, 96, 34–35, 87, 155; 280/751, 801.1; 297/482; 414/607; 296/100.16, 182.1, 3, 32, 39.2, 43, 50
See application file for complete search history.

(56) References Cited

U.S. PATENT DOCUMENTS

| | | | | |
|---|---|---|---|---|
| 3,128,106 | A * | 4/1964 | Zinkel, Jr. ............ | B60P 7/0869 24/68 CD |
| 3,376,865 | A * | 4/1968 | Gamper ................. | A61F 5/24 128/DIG. 15 |
| 3,941,159 | A * | 3/1976 | Toll ....................... | F16L 59/022 138/147 |
| 5,050,924 | A * | 9/1991 | Hansen ................. | B60P 7/0876 296/100.15 |
| 5,086,543 | A | 2/1992 | Mitchell | |
| 5,943,963 | A | 8/1999 | Beals | |
| 6,557,895 | B2 | 5/2003 | Haack | |
| 6,994,209 | B2 * | 2/2006 | Cediel .................. | B65G 15/32 198/847 |
| 7,311,483 | B1 | 12/2007 | Nudo | |
| 7,744,138 | B2 * | 6/2010 | St. Germain ........... | B66C 1/122 294/74 |
| 7,934,894 | B1 * | 5/2011 | Temple .................. | B65D 71/0096 410/34 |
| 2011/0272654 | A1 | 11/2011 | Fay | |

OTHER PUBLICATIONS http://www.truckntow.com/c-146921-corner-protectors.aspx; Corner Protectors Webpage from Truck N Tow; Received and Printed Jan. 17, 2015.
http://www.truckntow.com/p-10821-corner-protector-4-plastic.aspx; 4 Inch Corner Protectors Webpage from Truck N Tow; Received and Printed Jan. 17, 2015.
http://www.truckntow.com/p-10823-4-rubber-corner-protectors.aspx; 4" Rubber Corner Protectors Webpage from Truck N Tow; Received and Printed Jan. 17, 2015.
http://www.truckntow.com/p-10147-cordura-wear-pads.aspx; Cordura Wear Pads Webpage from Truck N Tow; Received and Printed Jan. 17, 2015.
www.ebay.com/itm/Rubber-Corner-Protectors-4-Wide-Winch-Strap-Guard-Tie-Down-Flatbed-Truck-10-pc-/140843928617; Corner Protector Webpage from Ebay; Received & Printed Jan. 17, 2015.
http://www.habasit.com/HNET/proden.nsf/%28LuAllByUNID%29/4F19077202B2BD96C1257387004F999B?openDocument; SAW-5E 07 Wepage from Habasit; Received and Printed Jan. 17, 2015.
https://www.veeboards.com/; Webpage from VeeBoards; Received and Printed Jan. 17, 2015.

* cited by examiner

*Primary Examiner* — Glenn Dayoan
*Assistant Examiner* — Sunsurraye Westbrook
(74) *Attorney, Agent, or Firm* — Neustel Law Offices; Michael S. Neustel (57) ABSTRACT

A strap protection system for effectively protecting cargo, straps and chains. The strap protection system generally includes a protective device having an elongated flat flexible structure, a first side adapted to be positionable adjacent to a cargo strap or a cargo chain, and a second side adapted to be positionable adjacent to a cargo object. A first inner fastener and a second inner fastener are attached to the protective device that are connectable to a first outer fastener and a second outer fastener respectively that are attached to the respective distal portions of the first strap and the second strap. The cargo strap or cargo chain is positioned adjacent the first side of the protective device and the straps are positioned over the cargo strap and secured to the inner fasteners thereby retaining the protective device adjacent to the cargo strap.

20 Claims, 11 Drawing Sheets

STRAP PROTECTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a strap protector and more specifically it relates to a strap protection system for effectively protecting cargo, straps and chains.

2. Description of the Related Art

Any discussion of the related art throughout the specification should in no way be considered as an admission that such related art is widely known or forms part of common general knowledge in the field.

Strap protectors (a.k.a. corner protectors, vee boards or tie down strap protectors) are used to protect cargo being transported on trailers from strap damage, chain damage and to reduce the wear on the cargo straps used to secure the cargo. Conventional strap protectors provide a protective layer between the edge of the cargo and the cargo strap that secures the cargo to the vehicle. Conventional strap protectors are either prone to breakage particularly during cold weather conditions and/or require the user to feed the cargo strap through slots in the strap protectors. Another problem with conventional strap protectors is that they are prone to movement during strapping and tightening the cargo straps. Another problem with conventional strap protectors is that they are not suitable for securing additional strapping that remains after tightening the straps.

Because of the inherent problems with the related art, there is a need for a new and improved strap protection system for effectively protecting cargo, straps and chains.

BRIEF SUMMARY OF THE INVENTION

The invention generally relates to a strap protector which includes a protective device having an elongated flat flexible structure, a first side adapted to be positionable adjacent to a cargo strap or a cargo chain, and a second side adapted to be positionable adjacent to a cargo object. A first inner fastener and a second inner fastener are attached to the protective device that are connectable to a first outer fastener and a second outer fastener respectively that are attached to the respective distal portions of the first strap and the second strap. The cargo strap or cargo chain is positioned adjacent the first side of the protective device and the straps are positioned over the cargo strap and secured to the inner fasteners thereby retaining the protective device adjacent to the cargo strap.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 10 illustrate a strap protection system 10, which comprises a protective device 20 having an elongated flat flexible structure, a first side 22 adapted to be positionable adjacent to a cargo strap 12 or a cargo chain, and a second side 24 adapted to be positionable adjacent to a cargo object 14. A first inner fastener 32 and a second inner fastener 42 are attached to the protective device 20 that are connectable to a first outer fastener 34 and a second outer fastener 44 respectively that are attached to the respective distal portions of the first strap 30 and the second strap 40. The cargo strap 12 or cargo chain is positioned adjacent the first side 22 of the protective device 20 and the straps are positioned over the cargo strap 12 and secured to the inner fasteners thereby retaining the protective device 20 adjacent to the cargo strap 12.

B. Protective Device.

The protective device 20 has an elongated flat structure and is preferably comprised of a flexible material (e.g. plastic, strap, belting, etc.). The protective device 20 is designed to be positionable between a cargo restraint 12 such as a cargo strap 12 and the cargo object 14 that is secured to a trailer 16 (or vehicle) by the cargo restraint 12.

The protective device 20 includes a first end 26 and a second end 28 opposite of the first end 26 with a longitudinal axis extending between the first end 26 and the second end 28. The protective device 20 further includes a first side 22 and a second side 24 opposite of the first side 22. The first side 22 and the second side 24 are both preferably comprised of a substantially flat structure and are further preferably parallel with respect to one another. The first side 22 of the protective device 20 is adapted to be positionable adjacent to an elongated cargo restraining device (e.g. a cargo strap 12, a cargo chain, etc.). The second side 24 of the protective device 20 is adapted to be positionable adjacent to a cargo object 14.

Figure 1:
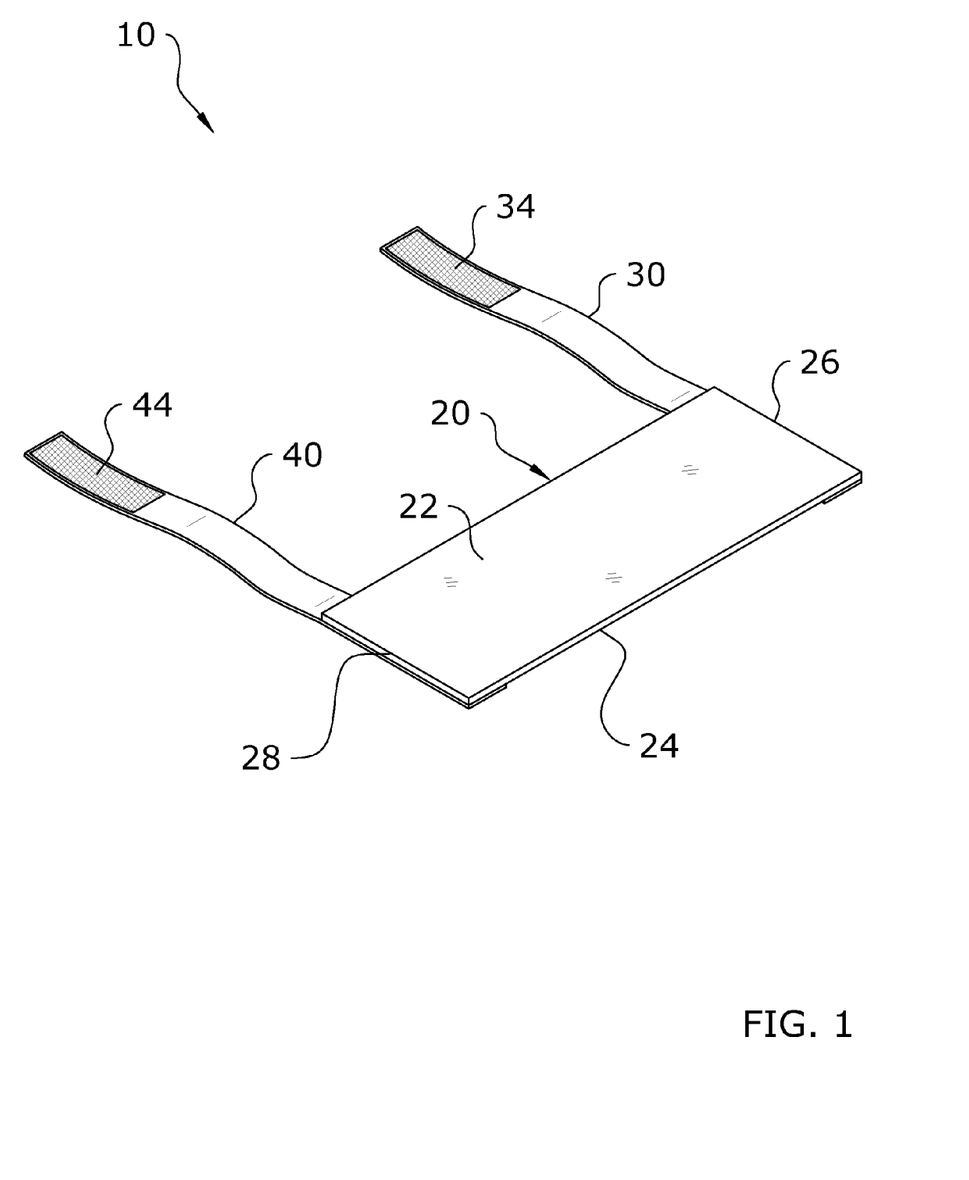
FIG. 1 is an upper perspective view of the first side of the protective device.
Figure 4:
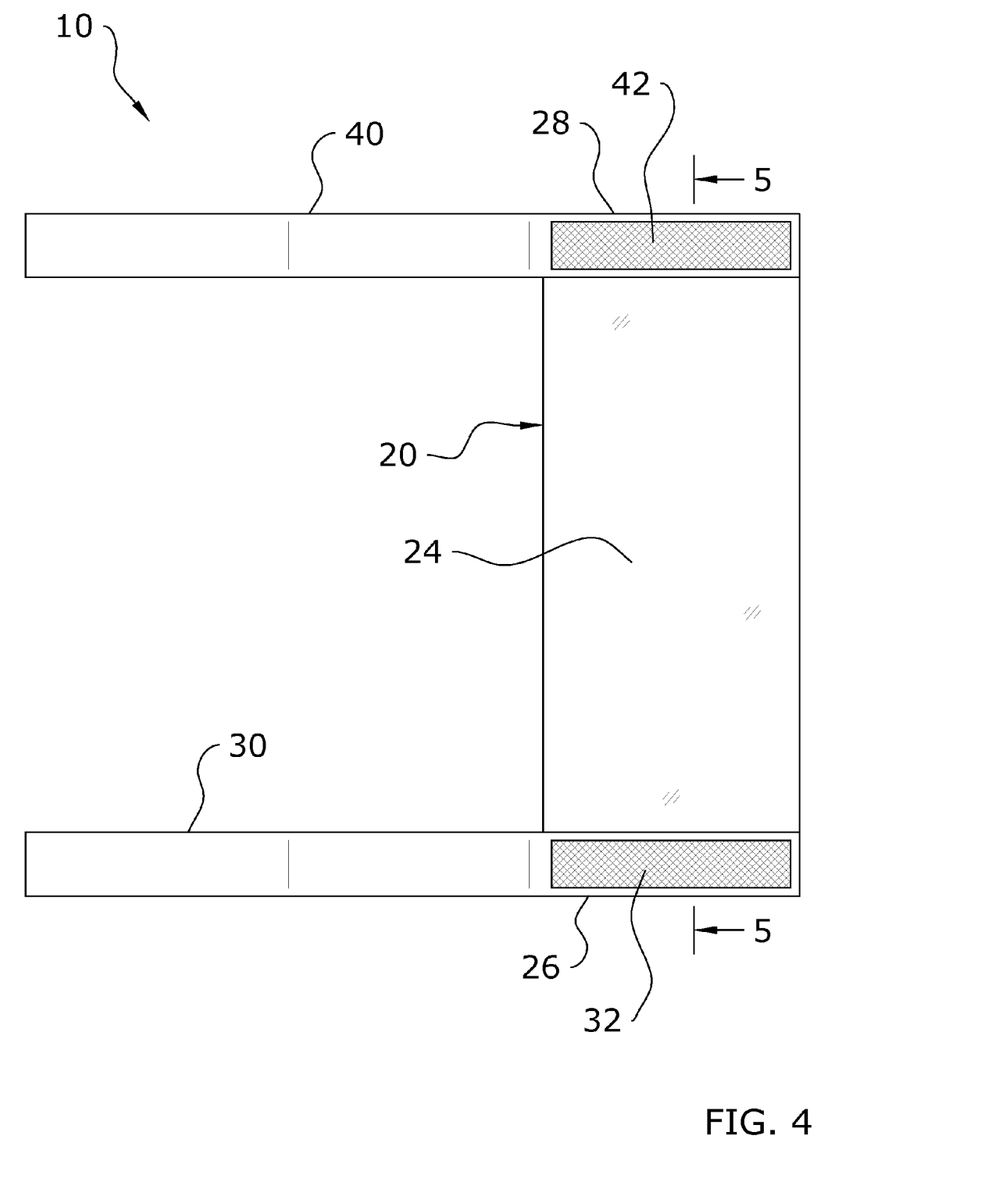
FIG. 4 is a top view of the second side of the protective device.

The protective device 20 is preferably constructed of a flat elongated rectangular shaped structure as illustrated in FIGS. 1 and 4 of the drawings. While the protective device 20 may have various lengths greater than or less than one foot, the protective device 20 preferably has a length of approximately one foot measured from the first end 26 to the second end 28. The protective device 20 preferably has a width of at least two inches measured from a first edge to a second edge of the protective device 20 (e.g. the protective device 20 may have a width of three inches, four inches, five inches, etc.). The width of the protective device 20 is preferably equal to or greater than the width of the cargo restraint 12 to be connected to.

The protective device 20 is preferably constructed of a strap material or a belt material such as a conveyor belt material. The protective device 20 is further preferably constructed of a flexible polyvinylchloride (PVC) conveyor belt or PVC processing belt. The inventor has found that the PVC conveyor belt manufactured by Habasit AG as SAW-5E 07 is a suitable PVC conveyor belt to construct the protective device 20 with the first side 22 of the protective device 20 being comprised of a polyester (PET) fabric and the second side 24 of the protective device 20 being comprised of a polyvinylchloride (PVC) material having a waffle structure. U.S. Pat. No. 6,994,209 to Cediel et al. also discloses a conveyor belt that is suitable for usage as the protective device 20 and is hereby incorporated by reference in its entirety herein.

Figure 5:
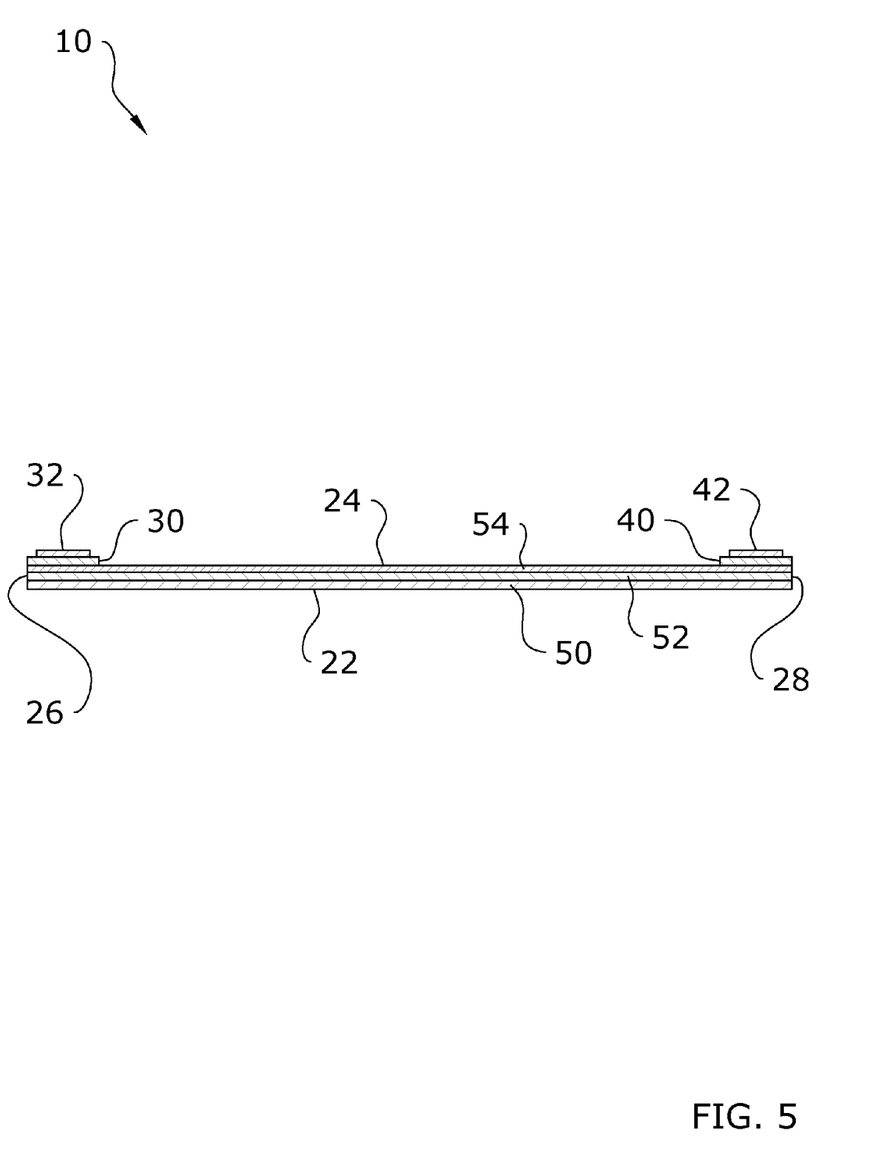
FIG. 5 is a cross sectional view taken along line 5-5 of FIG. 4.
Figure 6A:
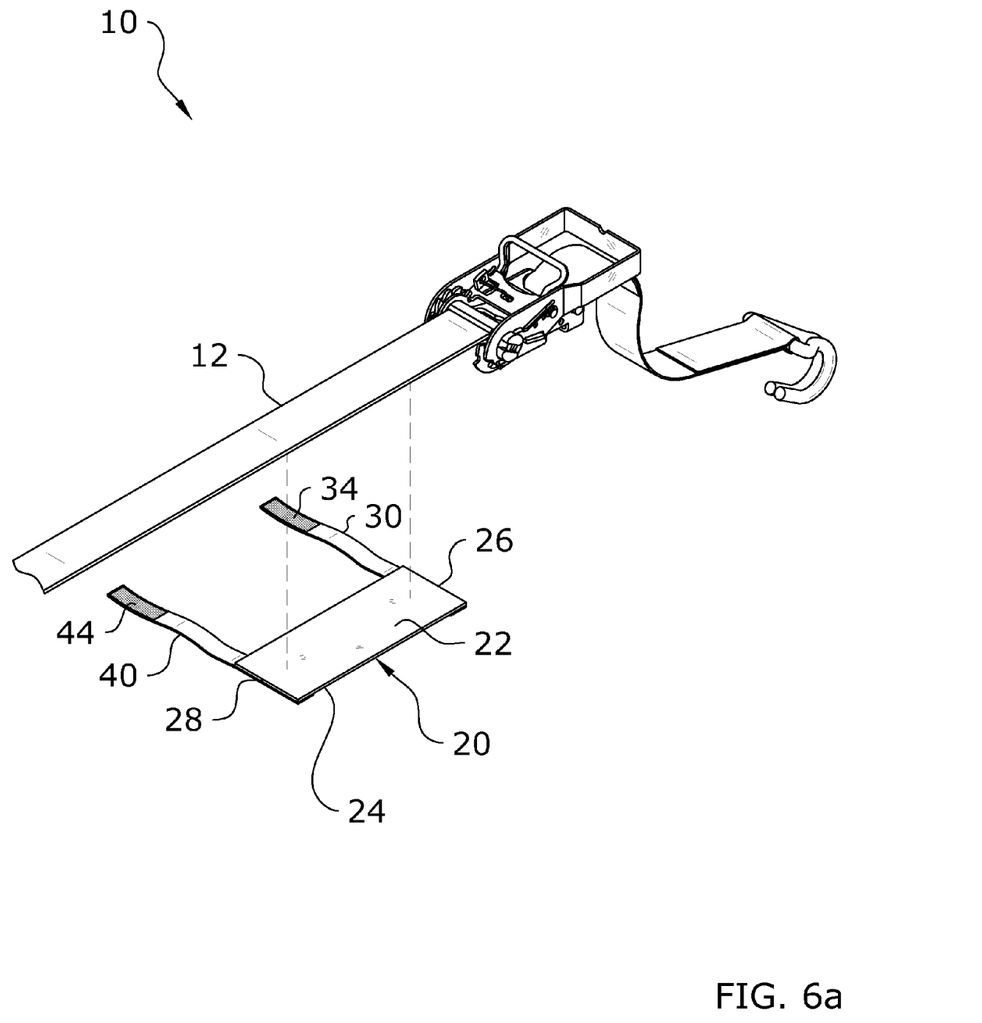
FIG. 6a is an upper perspective view of the present invention positioned below a cargo strap.
Figure 6B:
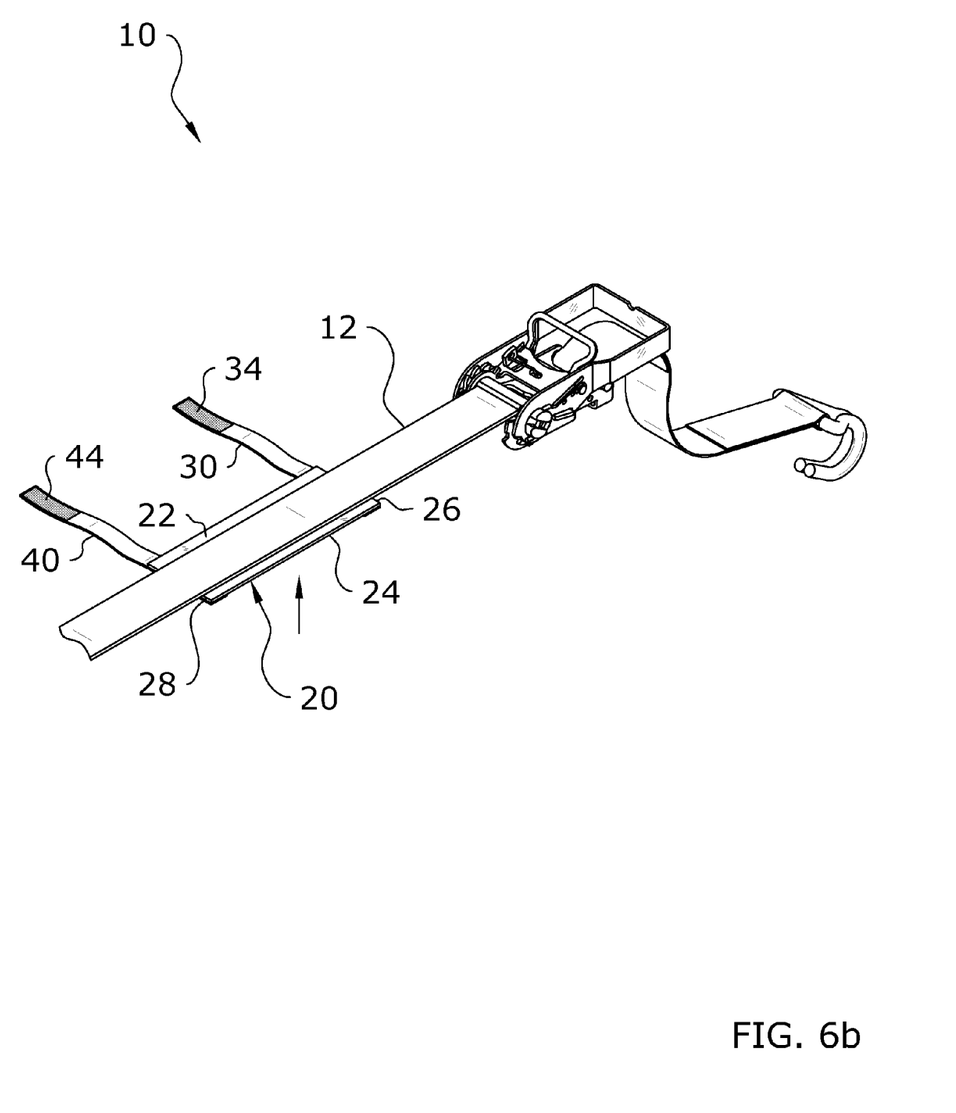
FIG. 6b is an upper perspective view of the first side of the protective device positioned adjacent to the lower surface of the cargo strap.
Figure 6C:
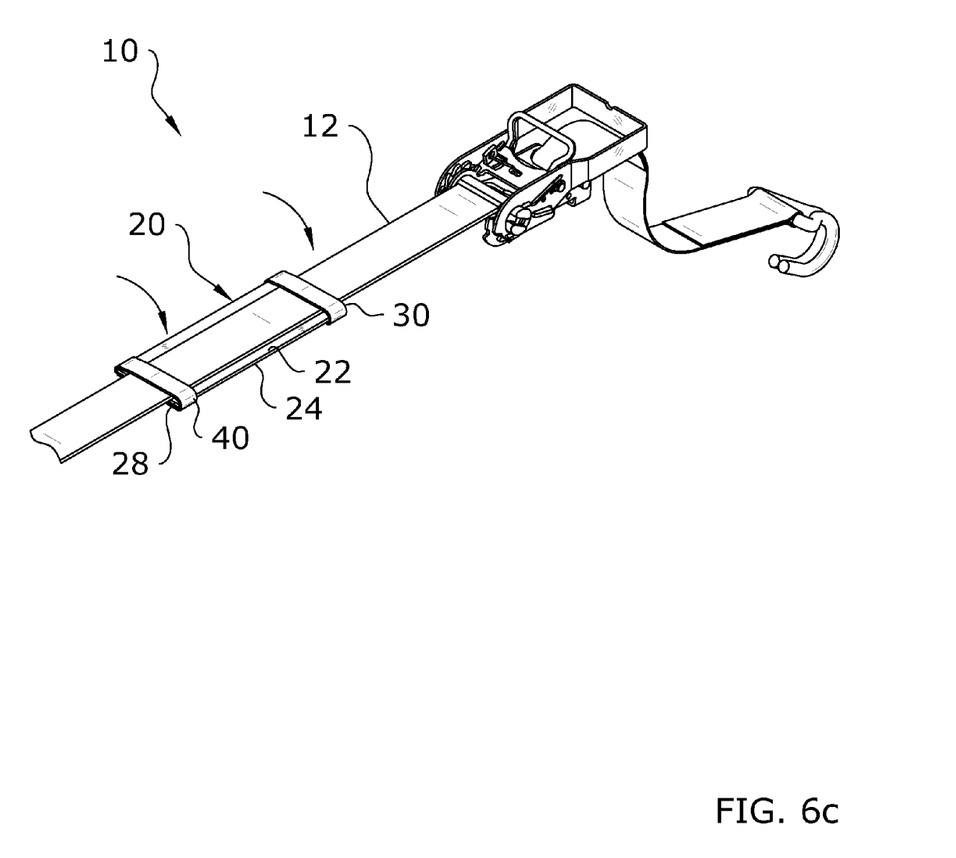
FIG. 6c is an upper perspective view of the first strap and the second strap secured around the cargo strap.

FIG. 5 illustrates the protective device 20 constructed of a plurality of laminated layers having at least a first layer 50, a second layer 52 and a third layer 54. The first layer 50 forms the first side 22 of the protective device 20 and the third layer 54 forms the second side 24 of the protective device 20. The first layer 50 is comprised of a material suitable for being positioned adjacent to the cargo strap 12 such as a polyester (PET) fabric. The second layer 52 is comprised of a strong material resistant to stretching such as polyester (PET). The third layer 54 is comprised of material that will not damage the cargo object 14 such as polyvinylchloride (PVC). The third layer 54 may also have a waffle type pattern.

C. First Strap and Fasteners.

Figure 3:
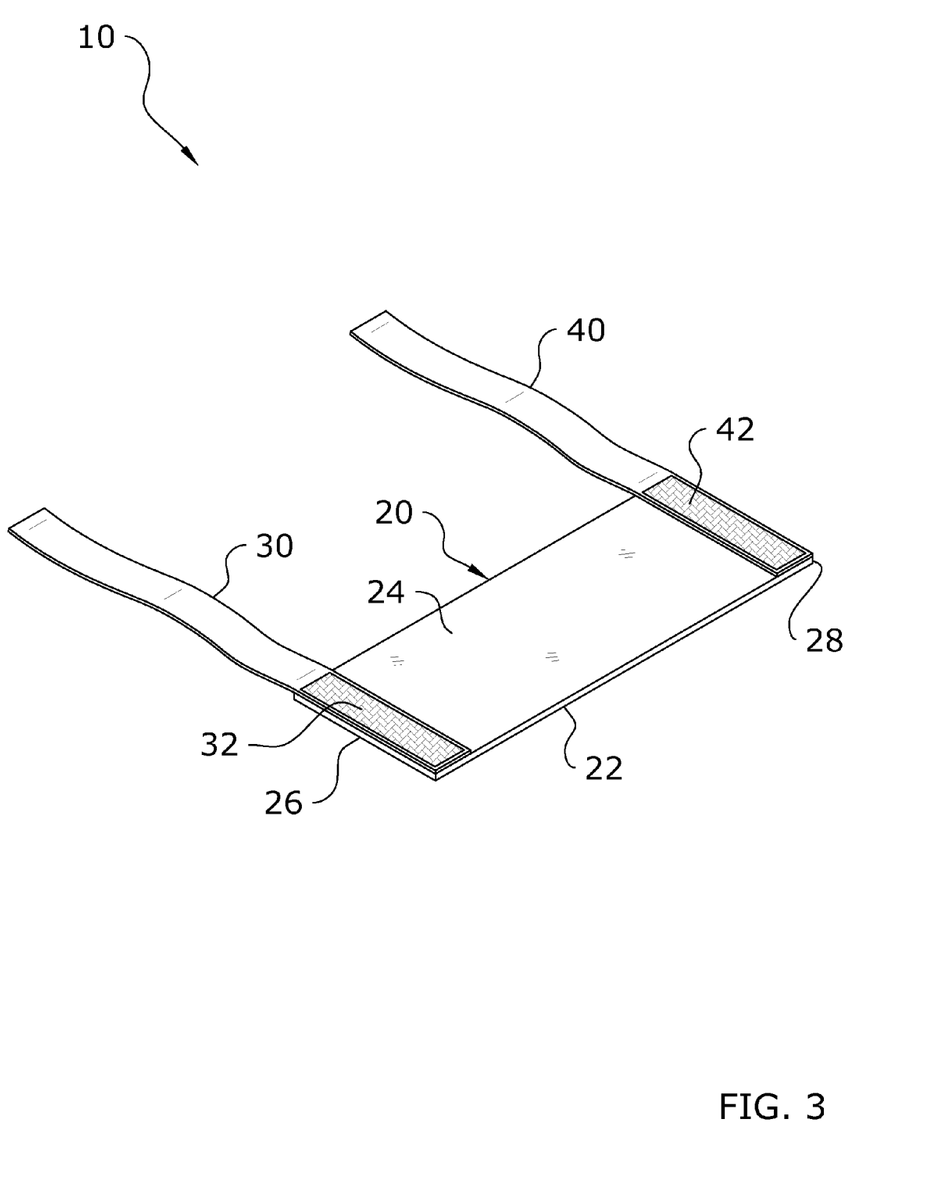
FIG. 3 is an upper perspective view of the second side of the protective device.

The first inner fastener 32 is attached to the protective device 20 as illustrated in FIGS. 3, 4 and 5 of the drawings. The first inner fastener 32 is preferably comprised of an elongated fastener and is further preferably constructed of a hook and loop fastener material to allow for easy attachment and removal with respect to the first outer fastener 34.

The first strap 30 is secured to the protective device 20 near the first end 26. The first strap 30 extends outwardly from the protective device 20 a distance sufficient to wrap around the cargo restraint 12 positioned adjacent to the first side 22 of the protective device 20. The width of the first strap 30 is smaller than the width of the protective device 20 as best illustrated in FIGS. 2 and 4 of the drawings.

Figure 2:
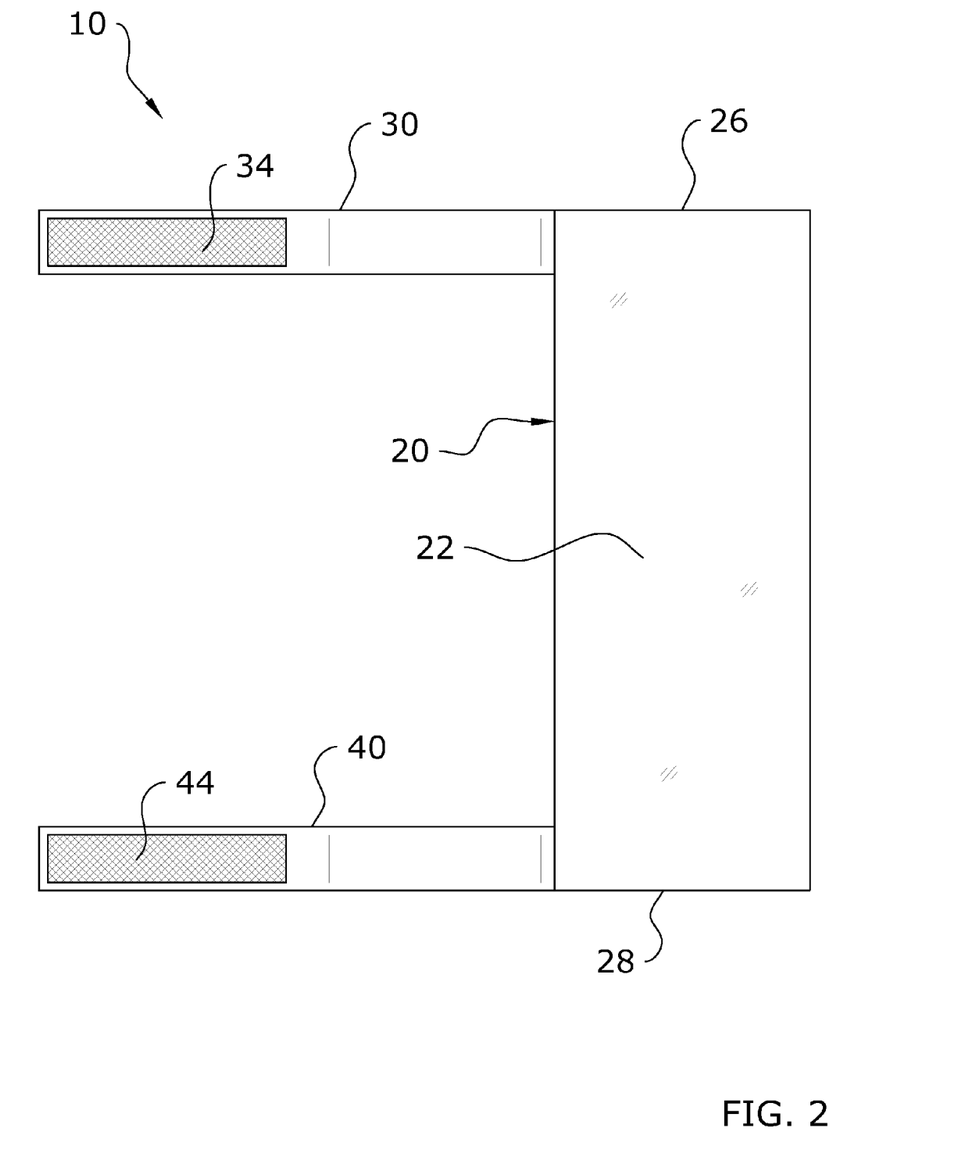
FIG. 2 is a top view of the first side of the protective device.

A first outer fastener 34 is attached to a first distal portion of the first strap 30 opposite of the protective device 20 as best illustrated in FIGS. 1 and 2 of the drawings. The first outer fastener 34 is removably connectable to the first inner fastener 32 to secure the first strap 30 about the cargo restrain thereby preventing movement of the protective device 20 with respect to the cargo restraint 12. The first outer fastener 34 is preferably comprised of a hook and loop fastener to allow for easy connection and removal to the first inner fastener 32. The first inner fastener 32 is preferably attached to an opposite side of the first strap 30 than what the first outer fastener 34 is attached to as illustrated in FIGS. 1 and 3 of the drawings.

D. Second Strap and Fasteners.

The second inner fastener 42 is attached to the protective device 20 as illustrated in FIGS. 3, 4 and 5 of the drawings. The second inner fastener 42 is preferably comprised of an elongated fastener and is further preferably constructed of a hook and loop fastener material to allow for easy attachment and removal with respect to the second outer fastener 44.

The second strap 40 is secured to the protective device 20 near the second end 28. The second strap 40 extends outwardly from the protective device 20 a distance sufficient to wrap around the cargo restraint 12 positioned adjacent to the second side 24 of the protective device 20. The width of the second strap 40 is smaller than the width of the protective device 20 as best illustrated in FIGS. 2 and 4 of the drawings.

A second outer fastener 44 is attached to a second distal portion of the second strap 40 opposite of the protective device 20 as best illustrated in FIGS. 1 and 2 of the drawings. The second outer fastener 44 is removably connectable to the second inner fastener 42 to secure the second strap 40 about the cargo restrain thereby preventing movement of the protective device 20 with respect to the cargo restraint 12. The second outer fastener 44 is preferably comprised of a hook and loop fastener to allow for easy connection and removal to the second inner fastener 42. The second inner fastener 42 is preferably attached to an opposite side of the second strap 40 than what the second outer fastener 44 is attached to as illustrated in FIGS. 1 and 3 of the drawings.

The protective device 20, the first strap 30 and the second strap 40 preferably form a substantially U-shaped structure as illustrated in FIGS. 2 and 4 of the drawings. The first strap 30 and the second strap 40 are preferably attached to the second side 24 of the protective device 20 so that the first side 22 of the protective device 20 is completely flat for attaching to the cargo strap 12. The first inner fastener 32 is preferably attached to an inner portion of the first strap 30 that is attached to the second side 24 and the second inner fastener 42 is preferably attached to an inner portion of the second strap 40 that is attached to the second side 24 as illustrated in FIGS. 3, 4 and 5 of the drawings.

Figure 10:
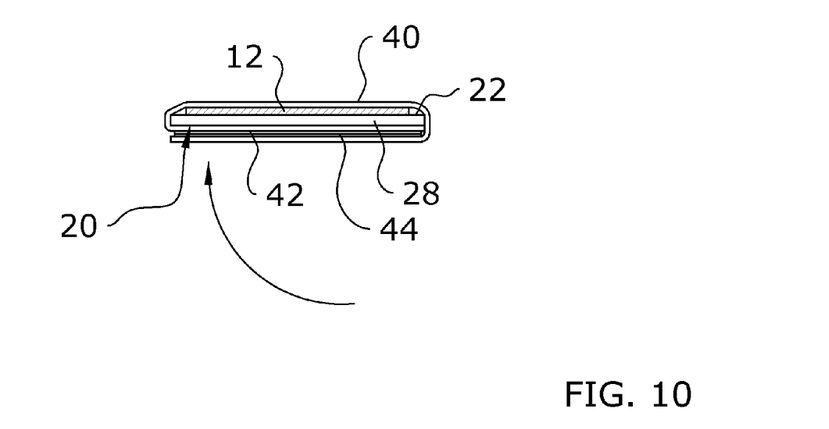
FIG. 10 is an end view of the second strap secured over the cargo strap with the fasteners connected together to prevent removal or loosening of the second strap.

The first strap 30 is preferably parallel with respect to the second strap 40. The first strap 30 and the second strap 40 are further substantially transverse with respect to the longitudinal axis of the protective device 20 as illustrated in FIGS. 2 and 4 of the drawings. The first strap 30 and the second strap 40 both extend outwardly from a first edge of the protective device 20 as further shown in FIGS. 2 and 4. The first strap 30 and the second strap 40 preferably do not extend outwardly from a second edge of the protective device 20 that is opposite of the first edge of the protective device 20. The first strap 30 and the second strap 40 preferably extend outwardly from the protective device 20 at least 11 inches, however, greater or less distances of extension may be used. It is important that the first strap 30 and the second strap 40 have a length sufficient to pass over at least one layer of cargo strap 12 as illustrated in FIG. 10 and the straps 30, 40 further are preferably sufficient in length to pass over multiple layers of the cargo strap 12 to provide secure stowage of extra cargo strap 12 as illustrated in FIG. 8 of the drawings.

E. Operation of Preferred Embodiment.

Figure 7:
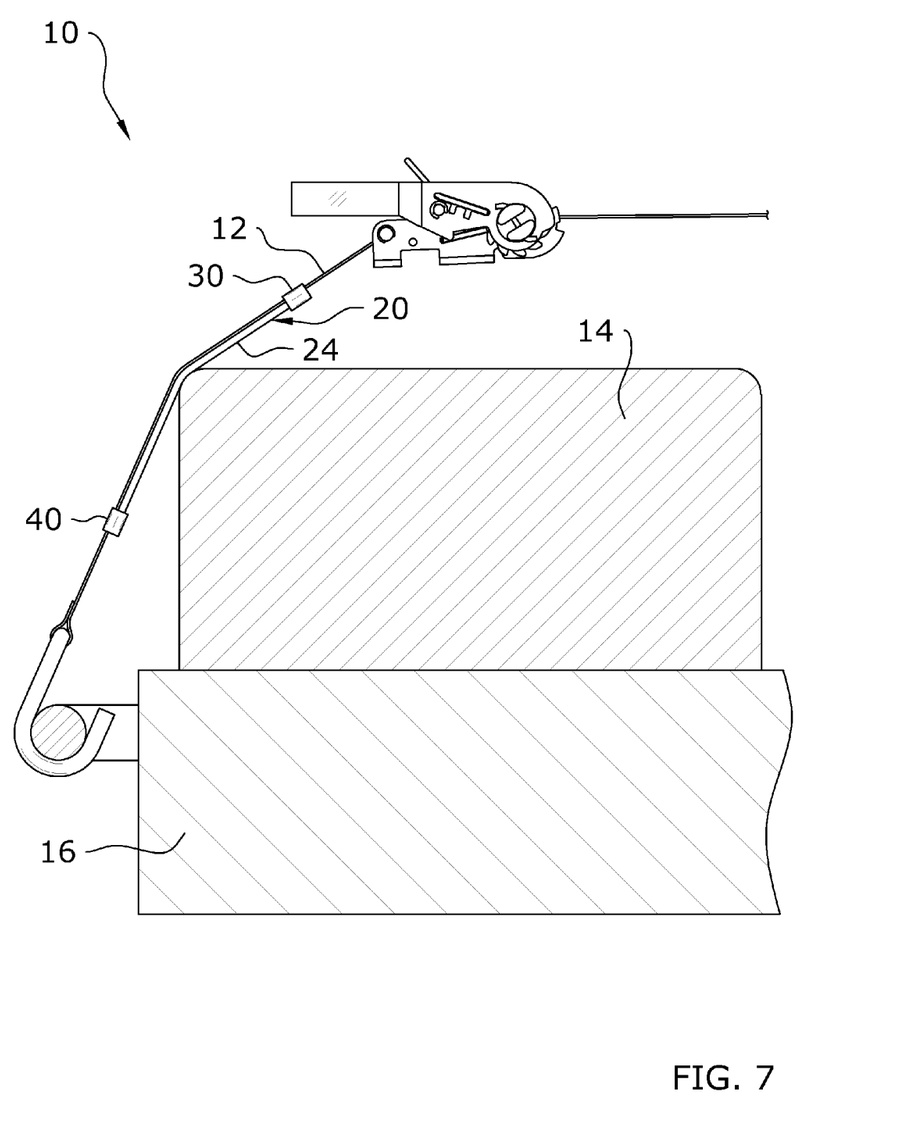
FIG. 7 is a side view of the present invention attached to a cargo strap with the protective device positioned between the cargo strap and the cargo.

FIGS. 6a through 7, 9 and 10 of the drawings illustrate usage of the present invention for protecting the cargo object 14 and the cargo strap 12. It can be appreciated that the present invention is suitable for various types of elongated cargo restrains such as, but not limited to, straps, chains, cables and the like. The user the positions the first side 22 of the protective device 20 adjacent to the interior surface of the portion of the cargo strap 12 to be protected and that will be near the edge of the cargo object 14. The user then wraps the first strap 30 and the second strap 40 around the cargo strap 12 in a taut manner followed by attaching the outer fasteners 34, 44 to the inner fasteners 32, 42 respectively. After the straps 30, 40 are properly attached, the protective device 20 will not move along the length of the cargo strap 12 thereby allowing the user to secure the cargo strap 12 to the trailer 16 (or vehicle) to secure the cargo object 14 thereto. As illustrated in FIG. 7, the protective device 20 is positioned between the cargo strap 12 and the cargo object 14 with a portion of the second side 24 of the protective device 20 in contact with the cargo object 14 to protect the cargo object 14 from damage (and prevent damage to the cargo strap 12). When finished using the protective device 20, the user simply releases the outer fasteners 34, 44 from the inner fasteners 32, 42 respectively thereby allowing the straps 30, 40 to be released so the protective device 20 may be removed from the cargo strap 12.

Figure 8:
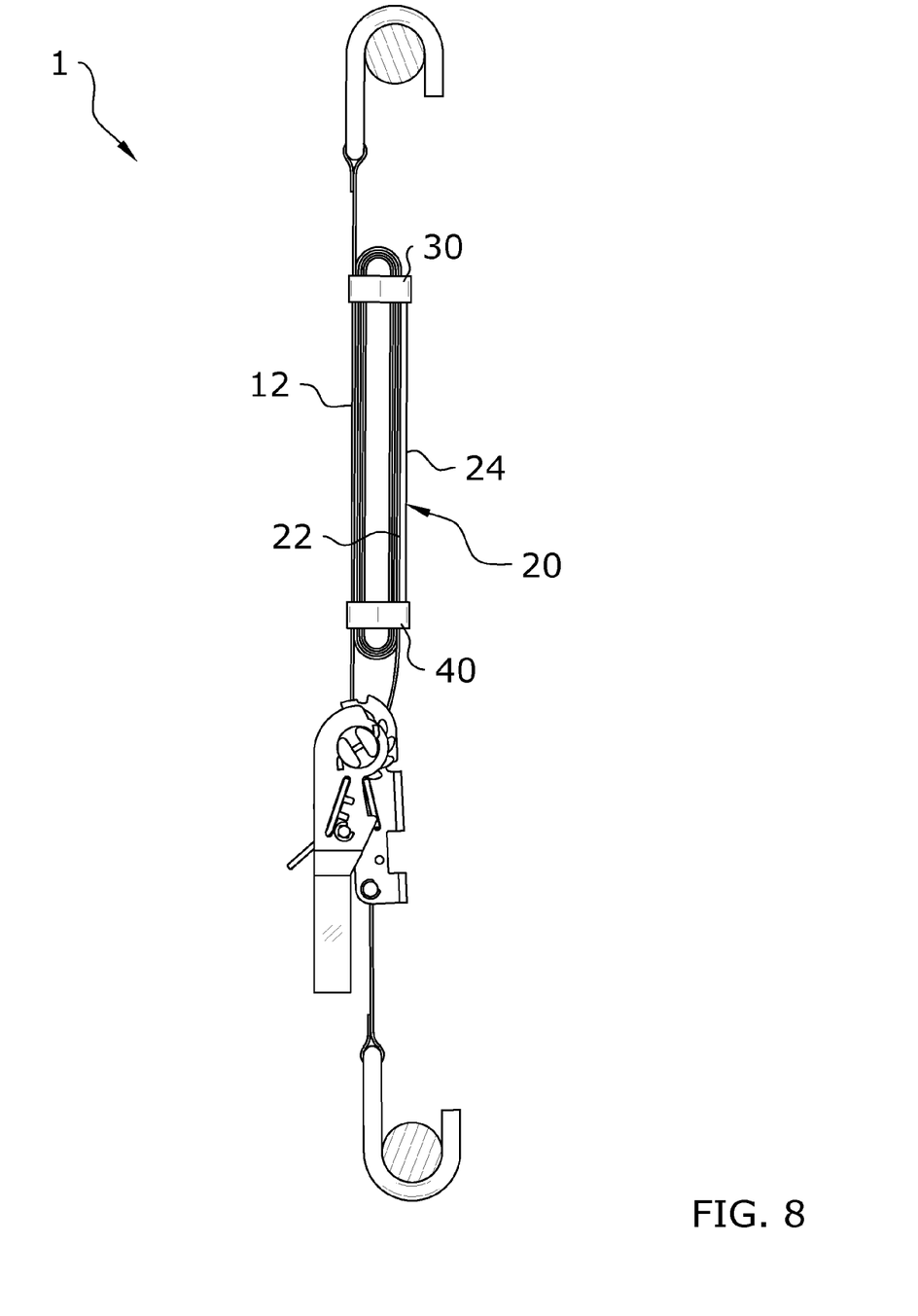
FIG. 8 is a side view of the present invention securing extra cargo strap.
Figure 9:
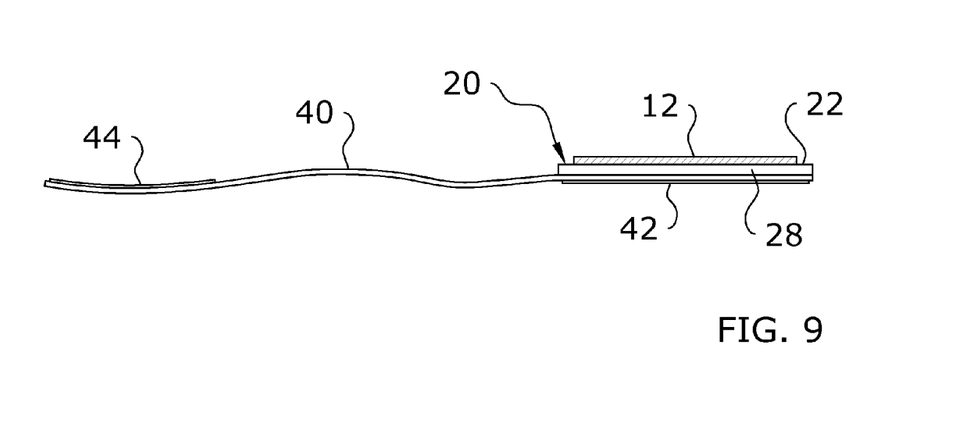
FIG. 9 is an end view of the cargo strap positioned upon the first side of the protective device.

FIG. 8 illustrates the present invention being utilized to secure the extra cargo strap 12 that sometimes occurs when tightening the cargo strap 12 to secure the cargo object 14 to the trailer 16. The extra length of cargo strap 12 is looped upon itself in a flattened loop structure and the protective device 20 is positioned adjacent to one side of the flattened loop structure as further shown in FIG. 8. The straps 30, 40 are wrapped around the flattened loop structure with the distal portions of the straps 30, 40 secured to the protective device 20 by attaching the outer fasteners 34, 44 to the inner fasteners 32, 42 respectively. When finished using the protective device 20 for stowing the extra length of cargo strap 12, the user simply releases the outer fasteners 34, 44 from the inner fastener 32, 42 respectively thereby allowing the straps 30, 40 to be released so the protective device 20 may be removed from the flattened loop structure.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A strap protection system, comprising:
   a protective device having an elongated flat structure, a first end, a second end opposite of said first end, a first side, a second side opposite of said first side, and a longitudinal axis, wherein said first side is adapted to be positionable adjacent to a cargo strap or a cargo chain, and wherein said second side is adapted to be positionable adjacent to a cargo object;
   a first inner fastener attached to said protective device;
   a first strap secured said protective device near said first end, wherein said first strap extends outwardly from said protective device;
   a first outer fastener attached to a first distal portion of said first strap opposite of said protective device, wherein said first outer fastener is connectable to said first inner fastener;
   a second inner fastener attached to said protective device;
   a second strap secured said protective device near said second end, wherein said second strap extends outwardly from said protective device; and
   a second outer fastener attached to a second distal portion of said second strap opposite of said protective device, wherein said second outer fastener is connectable to said second inner fastener.

2. The strap protection system of claim 1, wherein said protective device is comprised of a flat rectangular shaped structure.

3. The strap protection system of claim 1, wherein said protective device is comprised of a strap.

4. The strap protection system of claim 1, wherein said protective device is comprised of a conveyor belt.

5. The strap protection system of claim 4, wherein said protective device is comprised of a polyvinylchloride conveyor belt.

6. The strap protection system of claim 5, wherein said second side of said protective device is comprised of a layer of polyvinylchloride.

7. The strap protection system of claim 6, wherein said first strap and said second strap are attached to said second side of said protective device.

8. The strap protection system of claim 7, wherein said first inner fastener is attached to an inner portion of said first strap that is attached to said second side and wherein said second inner fastener is attached to an inner portion of said second strap that is attached to said second side.

9. The strap protection system of claim 1, wherein said first side is parallel with respect to said second side of said protective device.

10. The strap protection system of claim 1, wherein said first strap is parallel with respect to said second strap.

11. The strap protection system of claim 10, wherein said first strap and said second strap are substantially transverse with respect to said longitudinal axis of said protective device.

12. The strap protection system of claim 11, wherein said first strap and said second strap both extend outwardly from a first edge of said protective device.

13. The strap protection system of claim 12, wherein said first strap and said second strap do not extend outwardly from a second edge of said protective device, wherein said second edge is opposite of said first edge of said protective device.

14. The strap protection system of claim 1, wherein said first strap and said second strap extend outwardly from said protective device at least 11 inches.

15. The strap protection system of claim 1, wherein said protective device has a length of approximately 1 foot measured from said first end to said second end.

16. The strap protection system of claim 1, wherein said protective device has a width of at least 2 inches measured from a first edge to a second edge of said protective device.

17. The strap protection system of claim 1, wherein said protective device, said first strap and said second strap form a U-shaped structure.

18. A strap protection system, comprising:
a protective device having an elongated flat flexible structure, a first end, a second end opposite of said first end, a first side, a second side opposite of said first side, and a longitudinal axis, wherein said first side is adapted to be positionable adjacent to a cargo strap or a cargo chain, and wherein said second side is adapted to be positionable adjacent to a cargo object;
wherein said first side is parallel with respect to said second side of said protective device;
wherein said protective device is comprised of a flat rectangular shaped structure;
wherein said second side of said protective device is comprised of a layer of polyvinylchloride;
a first inner fastener attached to said protective device;
a first strap secured said protective device near said first end, wherein said first strap extends outwardly from said protective device;
a first outer fastener attached to a first distal portion of said first strap opposite of said protective device, wherein said first outer fastener is connectable to said first inner fastener;
a second inner fastener attached to said protective device;
a second strap secured said protective device near said second end, wherein said second strap extends outwardly from said protective device; and
a second outer fastener attached to a second distal portion of said second strap opposite of said protective device, wherein said second outer fastener is connectable to said second inner fastener;
wherein said first strap and said second strap are attached to said second side of said protective device;
wherein said first inner fastener is attached to an inner portion of said first strap that is attached to said second side and wherein said second inner fastener is attached to an inner portion of said second strap that is attached to said second side;
wherein said first strap is parallel with respect to said second strap;
wherein said first strap and said second strap are substantially transverse with respect to said longitudinal axis of said protective device;
wherein said first strap and said second strap both extend outwardly from a first edge of said protective device and wherein said first strap and said second strap do not extend outwardly from a second edge of said protective device, wherein said second edge is opposite of said first edge of said protective device.

19. A strap protection system, comprising:
a protective device having an elongated flat flexible structure, a first end, a second end opposite of said first end, a first side, a second side opposite of said first side, and a longitudinal axis, wherein said first side is adapted to be positionable adjacent to a cargo strap or a cargo chain, and wherein said second side is adapted to be positionable adjacent to a cargo object;
wherein said protective device is comprised of a strap or a conveyor belt;
wherein said first side is parallel with respect to said second side of said protective device;
wherein said protective device is comprised of a flat elongated rectangular shaped structure;
wherein said protective device has a length of approximately 1 foot measured from said first end to said second end;
wherein said protective device has a width of at least 2 inches measured from a first edge to a second edge of said protective device;
wherein said second side of said protective device is comprised of a layer of polyvinylchloride;
a first inner fastener attached to said protective device;
a first strap secured said protective device near said first end, wherein said first strap extends outwardly from said protective device;
a first outer fastener attached to a first distal portion of said first strap opposite of said protective device, wherein said first outer fastener is connectable to said first inner fastener;
a second inner fastener attached to said protective device;
a second strap secured said protective device near said second end, wherein said second strap extends outwardly from said protective device; and
a second outer fastener attached to a second distal portion of said second strap opposite of said protective device, wherein said second outer fastener is connectable to said second inner fastener;
wherein said protective device, said first strap and said second strap form a U-shaped structure;
wherein said first strap and said second strap are attached to said second side of said protective device;
wherein said first inner fastener is attached to an inner portion of said first strap that is attached to said second side and wherein said second inner fastener is attached to an inner portion of said second strap that is attached to said second side;
wherein said first strap is parallel with respect to said second strap;
wherein said first strap and said second strap are substantially transverse with respect to said longitudinal axis of said protective device;
wherein said first strap and said second strap both extend outwardly from a first edge of said protective device and wherein said first strap and said second strap do not extend outwardly from a second edge of said protective device, wherein said second edge is opposite of said first edge of said protective device;
wherein said first strap and said second strap extend outwardly from said protective device at least 11 inches;
wherein said first inner fastener, said first outer fastener, said second inner fastener and said second outer fastener are comprised of a hook and loop fastener.

20. The strap protection system of claim 4, wherein said protective device is comprised of a polyvinylchloride conveyor belt.

* * * * *